US012792883B2

(12) United States Patent
Wegman et al.

(10) Patent No.: US 12,792,883 B2
(45) Date of Patent: Nov. 10, 2026

(54) AUTOENCODER WITH GENERATIVE ADVERSARIAL NETWORKS FOR TRANSFER LEARNING BETWEEN DOMAINS

(71) Applicants: International Business Machines Corporation, Armonk, NY (US); Purdue Research Foundation, Inc., West Lafayette, IN (US)

(72) Inventors: Mark Wegman, Mt. Kisco, NY (US); Yuhai Tu, Briarcliff Manor, NY (US); Xuan-Hong Dang, Chappaqua, NY (US); Ankush Singla, Hayward, CA (US); Adrian Shuai Li, West Lafayette, IN (US)

(73) Assignees: International Business Machines Corporation, Armonk, NY (US); Purdue Research Foundation, Inc.

( * ) Notice: Subject to any disclaimer, the term of this patent is extended or adjusted under 35 U.S.C. 154(b) by 823 days.

(21) Appl. No.: 18/129,540

(22) Filed: Mar. 31, 2023

(65) Prior Publication Data

US 2024/0330656 A1 Oct. 3, 2024

(51) Int. Cl.
*G06N 3/0455* (2023.01)
*G06N 3/084* (2023.01)

(52) U.S. Cl.
CPC ........... *G06N 3/0455* (2023.01); *G06N 3/084* (2013.01)

(58) Field of Classification Search
CPC ............................ G06N 3/0455; G06N 3/084
See application file for complete search history.

(56) References Cited

U.S. PATENT DOCUMENTS 10,373,055 B1 * 8/2019 Matthey-de-l'Endroit .................. G06N 3/084
2021/0390339 A1 12/2021 Ye

FOREIGN PATENT DOCUMENTS

CN 109492099 A 3/2019
CN 110364186 A 10/2019

(Continued)

OTHER PUBLICATIONS

Konstantinos Bousmalis et al., Domain Separation Networks, Aug. 22, 2016, arXiv, 1608.06019v1 (Year: 2016).*

(Continued)

*Primary Examiner* — David Yi
*Assistant Examiner* — Paul Coleman
(74) *Attorney, Agent, or Firm* — CHIP LAW GROUP

(57) ABSTRACT

A generator is configured to generate a domain-independent representation of an input data sample, an encoder is configured to generate a domain-dependent representation of the input data sample, and a decoder is configured to ensure that a combination of the domain-independent representation and the domain-dependent representation contains sufficient information to reconstruct the input data sample. A discriminator is configured to attempt to determine an originating domain of the domain-independent representation and a classifier is configured to classify the input data sample based on the domain-independent representation of the input data sample. The generator is configured to generate the domain-independent representation of the input data sample such that it fools the discriminator, enables the classifier to classify the input data sample, and enables the decoder to reconstruct the input sample from the domain-independent representation and the domain-dependent representation and wherein the domain-dependent representation is constrained to have low information content.

16 Claims, 7 Drawing Sheets

(56) References Cited

FOREIGN PATENT DOCUMENTS

| | | | |
|---|---|---|---|
| CN | 110458844 | A | 11/2019 |
| CN | 110705029 | A | 1/2020 |
| CN | 112365976 | A | 2/2021 |
| CN | 113344119 | A | 9/2021 |
| CN | 113536697 | A | 10/2021 |

OTHER PUBLICATIONS

Diederik P. Kingma et al., Auto-Encoding Variational Bayes, Dec. 10, 2022, arXiv, 1312.6114v11 (Year: 2022).*

Author: Behnam Gholami et. al.; Title: "Unsupervised Multi-Target Domain Adaptation: An Information Theoretic Approach", Date: Oct. 26, 2018; Publisher: arXiv—https://arxiv.org/abs/1810.11547 version 1. (Year: 2018).*

Konstantinos Bousmalis et al., Domain Separation Networks. 30th Conference on Neural Information Processing Systems (NIPS 2016), Barcelona, Spain. pp. 9.

Li et al., "Maximal Domain Independent Representations Improve Transfer Learning", https://arxiv.org/pdf/2306.00262v2, Feb. 15, 2024, 16 pages.

Singla et al., "Preparing Network Intrusion Detection Deep Learning Models with Minimal Data Using Adversarial Domain Adaptation", https://dl.acm.org/doi/10.1145/3320269.3384718, Oct. 5, 2020, pp. 127-140.

* cited by examiner

| Model | No SSC | Shift | Random |
|---|---|---|---|
| Source-only | 20.0 | 11.7 | 13.8 |
| GAN-based | 64.7 | 58.2 | 54.8 |
| DANN | 63.7 | 58.0 | 53.6 |
| DSN | 66.8 | 63.6 | 57.1 |
| VAEGAN | **66.9** | **65.7** | **61.6** |
| Target-only | 88.1 | 99.8 | 87.9 |

*FIG. 3*

| Model | No SSC | Shift | Random |
|---|---|---|---|
| GAN-based | 1.55 | 3.28 | 3.68 |
| DANN | 2.26 | 4.17 | 4.33 |
| DSN | 0.16 | 2.60 | 3.18 |

*FIG. 4*

| Model | 0% bias | 20% bias | 40% bias | 60% bias | 80% bias | 90% bias | 100% bias |
|---|---|---|---|---|---|---|---|
| Source-only | 10.0 | 10.0 | 10.0 | 10.0 | 10.0 | 10.0 | 10.0 |
| GAN-based | 63.0 | 62.5 | 61.4 | 56.9 | 53.2 | 44.5 | 30.1 |
| DANN | 62.7 | 62.0 | 61.0 | 56.5 | 52.2 | 42.9 | 29.1 |
| DSN | 68.7 | 67.9 | 67.3 | 67.5 | 64.5 | 61.7 | 32.2 |
| VAE-GAN | **70.4** | **69.8** | **69.8** | **69.7** | **68.2** | **64.1** | **34.2** |
| Target-only | 78.9 | 78.9 | 78.9 | 78.9 | 78.9 | 78.9 | 78.9 |

*FIG. 5*

| Model | 0% bias | 20% bias | 40% bias | 60% bias | 80% bias | 90% bias | 100% bias |
|---|---|---|---|---|---|---|---|
| GAN-based | 5.23 | 3.20 | 5.93 | 12.8 | 11.31 | 7.20 | 4.58 |
| DANN | 5.44 | 3.42 | 6.22 | 13.2 | 12.02 | 7.79 | 5.70 |
| DSN | 2.68 | 3.00 | 3.95 | 3.47 | 7.43 | 3.78 | 2.23 |

*FIG. 6*

AUTOENCODER WITH GENERATIVE ADVERSARIAL NETWORKS FOR TRANSFER LEARNING BETWEEN DOMAINS

This invention was made with government support under contract W911NF-16-3-0001 awarded by the U.S. Army Research Laboratory and the U.K. Defence Science and Technology Laboratory, and under grant CMMI 2134667 by the U.S. National Science Foundation (NSF). The U.S. and U.K. governments have certain rights to this invention.

BACKGROUND

The present invention relates generally to the electrical, electronic and computer arts and, more particularly, to neural networks, machine learning, and transfer learning.

Machine learning is often used to label data from different domains with the same set of classification labels. Unfortunately, labelled data useful for machine learning training may only exist for one of those domains. For example, the goal may be to identify what animals are in pictures of winter scenes, but only labelled pictures of animals in summer scenes may be available, or the goal may be to identify words from one type of speaker while labelled data from only another type of speaker may be available. A neural network trained for one domain, however, often does not work satisfactorily on data from another domain.

BRIEF SUMMARY

Principles of the invention provide techniques for an autoencoder with generative adversarial networks for transfer learning between domains. In one aspect, an exemplary method comprises generating a domain-independent representation of an input data sample; generating a domain-dependent representation of the input data sample; configuring a decoder to ensure that a combination of the domain-independent representation and the domain-dependent representation contains sufficient information to reconstruct the input data sample; configuring a discriminator to attempt to determine an originating domain of the domain-independent representation; configuring a classifier to classify the input data sample based on the domain-independent representation of the input data sample; and configuring a generator to generate the domain-independent representation of the input data sample such that it fools the discriminator, enables the classifier to classify the input data sample, and enables a reconstruction of the input sample from the domain-independent representation and the domain-dependent representation and wherein the domain-dependent representation is constrained to have low information content.

In one aspect, an apparatus includes a generator configured to generate a domain-independent representation of an input data sample; an encoder configured to generate a domain-dependent representation of the input data sample; a decoder configured to ensure that a combination of the domain-independent representation and the domain-dependent representation contains sufficient information to reconstruct the input data sample; a discriminator configured to attempt to determine an originating domain of the domain-independent representation; and a classifier configured to classify the input data sample based on the domain-independent representation of the input data sample; wherein the generator is configured to generate the domain-independent representation of the input data sample such that it fools the discriminator, enables the classifier to classify the input data sample, and enables the decoder to reconstruct the input sample from the domain-independent representation and the domain-dependent representation and wherein the domain-dependent representation is constrained to have low information content.

In one aspect, a computer program product comprises one or more tangible computer-readable storage media and program instructions stored on at least one of the one or more tangible computer-readable storage media, the program instructions executable by a processor, the program instructions comprising generating a domain-independent representation of an input data sample; generating a domain-dependent representation of the input data sample; configuring a decoder to ensure that a combination of the domain-independent representation and the domain-dependent representation contains sufficient information to reconstruct the input data sample; configuring a discriminator to attempt to determine an originating domain of the domain-independent representation; configuring a classifier to classify the input data sample based on the domain-independent representation of the input data sample; and configuring a generator to generate the domain-independent representation of the input data sample such that it fools the discriminator, enables the classifier to classify the input data sample, and enables a reconstruction of the input sample from the domain-independent representation and the domain-dependent representation and wherein the domain-dependent representation is constrained to have low information content.

As used herein, "facilitating" an action includes performing the action, making the action easier, helping to carry the action out, or causing the action to be performed. Thus, by way of example and not limitation, instructions executing on a processor might facilitate an action carried out by instructions executing on a remote processor, by sending appropriate data or commands to cause or aid the action to be performed. Where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques as disclosed herein can provide substantial beneficial technical effects. Some embodiments may not have these potential advantages and these potential advantages are not necessarily required of all embodiments. By way of example only and without limitation, one or more embodiments may provide one or more of:

- an autoencoder with a generative adversarial network for transfer learning between domains configured to mitigate a hidden data effect;
- improves the technological process of computerized machine learning by improving a machine learning classifier that handles data that has evolved over time without retraining the machine learning model;

improves the technological process of computerized machine learning by improving a machine learning classifier that handles data from a target domain that differs from the data of a training domain;

improves the technological process of computerized machine learning by improving the training time for a machine learning system by performing transfer learning to a machine learning model for a target domain;

improved classification accuracy relative to the size of the training database;

a discriminator configured to attempt to determine an originating domain of a domain-independent representation of an input data sample;

a classifier configured to classify an input data sample based on the domain-independent representation of the input data sample;

an encoder configured to generate a domain-dependent representation of the input data sample;

a decoder configured to ensure that a combination of the domain-independent representation and the domain-dependent representation contains sufficient information to reconstruct the input data sample;

a generator configured to generate a domain-independent representation of the input data sample that fools the discriminator, enables the classifier to classify the input data sample, and enables the decoder to reconstruct the input sample from the domain-independent representation and the domain-dependent representation; and synthetic benchmarks where the source classifier can take advantage of certain source-only, synthetic spurious correlation (SSC) information.

These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 3 is a table that summarizes the mean classification accuracy (%) of different unsupervised domain adaptation approaches for three synthetic spurious correlation scenarios, in accordance with an example embodiment;

FIG. 4 is a table showing the z-test score value of the comparison of the mean classification accuracy of the method of example embodiments with the mean classification accuracy of other methods over five independent runs, in accordance with an example embodiment;

FIG. 5 is a table showing the averaged classification accuracy (%) of different unsupervised domain adaptation approaches and example embodiments on the target test set, in accordance with an example embodiment;

FIG. 6 is a table showing the z-test score value comparing VAEGAN to other models, in accordance with an example embodiment;

Figure 1:
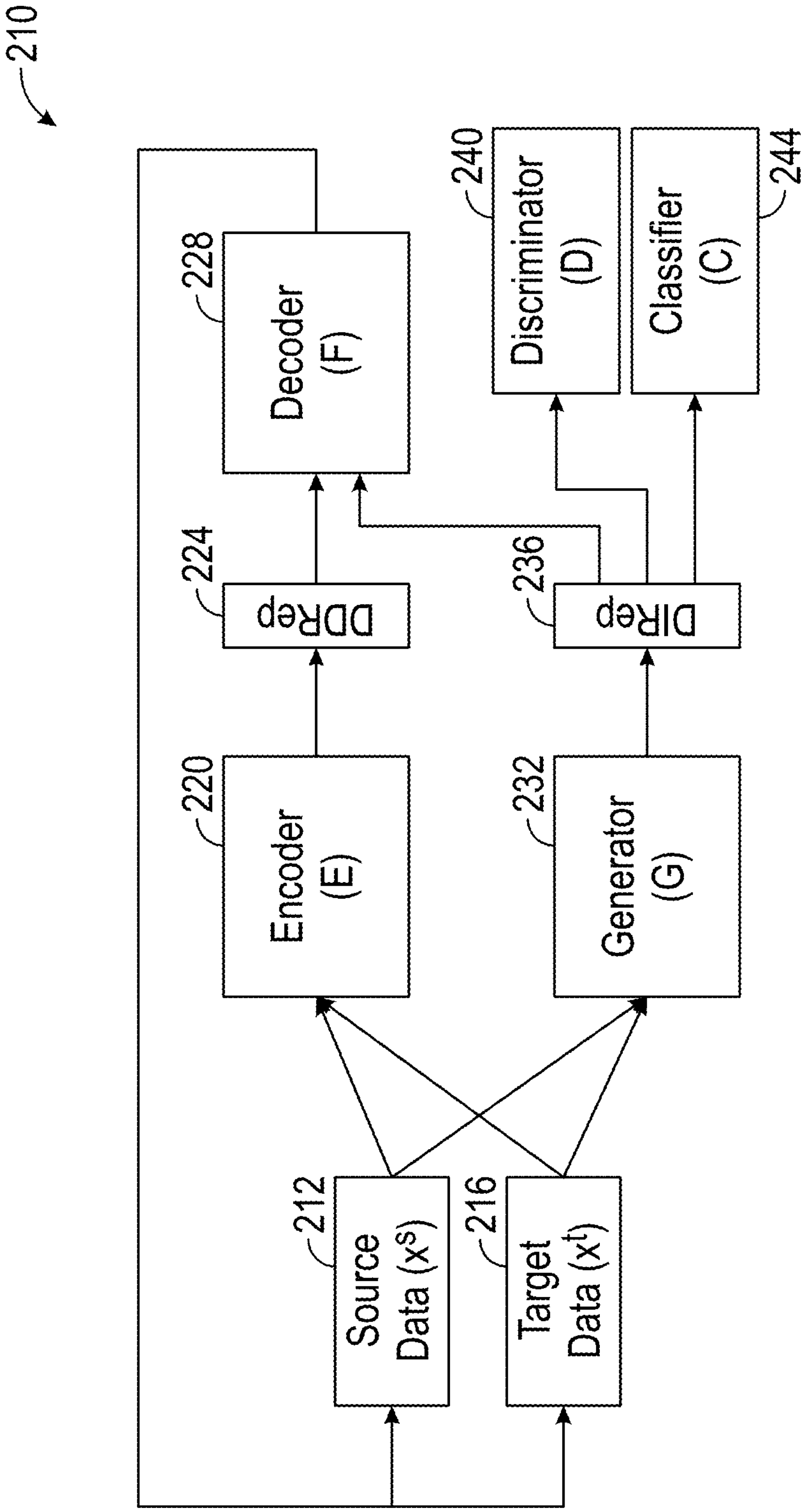
FIG. 1 is a block diagram for a variational autoencoder with generative adversarial network classifier system, in accordance with an example embodiment.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of inventions described herein will be in the context of illustrative embodiments. Moreover, it will become apparent to those skilled in the art given the teachings herein that numerous modifications can be made to the embodiments shown that are within the scope of the claims. That is, no limitations with respect to the embodiments shown and described herein are intended or should be inferred.

Neural networks are essentially systems that learn based on a loss function. An example system that uses a neural network, configured as an encoder/generator, takes a data input and creates a data representation of that input. The representation is typically fed into another neural network configured as a classifier for labeling the represented samples of data and may also be fed into a discriminator trained to distinguish whether the generated representation represents something originating from a source domain or a target domain. The encoder/generator is trained to ensure that the data representation "fools" the discriminator as to whether the representation is derived from source domain data or target domain data. Such a representation is called a domain independent representation since the originating domain is obfuscated.

It is recognized herein that a portion of the classification task is often inadvertently performed by the generator since the generator knows which domain the data comes from, instead of being performed by the classifier, as intended. This hidden data effect, as it is referred to herein, means that some of the domain-specific information is passing through the generator to the domain independent representation (DIRep). If the discriminator performs too well and is able to identify the originating domain of the data, the generator is encouraged to remove more information from the DIRep to reduce the performance of the discriminator. The DIRep, however, should be richer in information than required for the training of the classifier in order to prepare the classifier for future tasks, such as the ability to classify input data that has evolved over time or data from other domains.

It has also been recognized that the hidden data may have the same distribution in the source and target domains but, since it is close to random in the target domain as opposed to being indicative of classification as in the source domain, it is often only useful for labeling in the source domain and not in the target domain. This means that the classifier is being trained for the source domain and not the target domain, and transfer learning is not satisfactorily occurring.

Thus, in one example embodiment, an encoder is used to also generate a domain dependent representation of the input data. An autoencoder takes both representations, i.e., the domain dependent representation (DDRep) and the domain independent representation, as input and is trained along with the generator to ensure that the original input data sample can be reproduced from the combination of both representations. This essentially forces the DDRep to be as small as possible and forces the DIRep to include more of the domain independent information. That is, the requirement that the combination of the DDRep and the DIRep to contain enough information to faithfully reproduce the original data (via the autoencoder) while also making the DDRep as small as possible helps ensure that the DIRep has enough information to perform classification during training as well as for different data domains and for data that has evolved over time. In one example embodiment where the DDRep is only one bit (such as a label indicating the originating domain of the input data), the DIRep should contain a great amount of information for the autoencoder to be able to faithfully reproduce the original data sample.

In example embodiments, the size of the domain dependent representation is constrained by either using a measure of information content, such as a Kullback-Leibler (KL) Divergence, or constrained to be a single bit that, for example, encodes the name of the domain, as described above. This ensures that the domain independent representation does not get too small (that is, contains enough information for the classifier) and that the classification is not effectively performed by the generator. In one example embodiment, a different generator is used for the source domain and the target domain, dependent on the type of data. Both generators are used for training, while both generators or only the target generator may be used during inferencing. On at least some toy (i.e., simple, illustrative) examples, the disclosed results with the encoder have been measured to be superior to the generative adversarial networks (GANS) alone. This may have an advantage as a trainable knowledge representation mechanism for more than the transfer learning situation described herein.

In general, domain adaptation (DA) is a challenging problem in transfer learning. One popular approach for DA is to create a domain-independent representation (DIRep) learned by a generator from all input data samples and then to train a classifier based on the DIRep using the labeled samples. A domain discriminator is added to adversarially train the generator to exclude domain specific features from the DIRep. However, this approach tends to generate insufficient information for accurate classification learning. In one example embodiment, a novel approach integrates the adversarial model with a variational autoencoder. Besides the DIRep, a domain-dependent representation (DDRep) is introduced such that information from both the DIRep and DDRep is sufficient to reconstruct samples from both domains. The size of the DDRep is penalized to drive as much information as possible to the DIRep, which maximizes the accuracy of the classifier in labeling samples from both domains. Empirical evaluations of example embodiments of the model using synthetic datasets were performed and it was demonstrated that spurious class-related features introduced in the source domain are successfully absorbed by the DDRep. This leaves a rich and clean DIRep for accurate transfer learning in the target domain. Its superior performance against other algorithms for a number of common imaging datasets was also demonstrated.

Introduction

Labeling data for machine learning is a difficult and time-consuming process. In many instances, however, labeled data similar to the data to be labeled is available. For example, in the early days of speech recognition, the available transcripts consisted predominantly of male voices and a lot of transcripts for women's voices did not exist. Another example is image data. It is easier to label images presented in a familiar manner than labeling pictures taken with a color filter or an infrared camera. Is it possible to leverage the existing labeled data to perform machine learning tasks like classification for similar data that is not labeled?

Transfer learning, also known in the art as domain adaptation, generally means solving one problem and applying the knowledge acquired to a different, but related problem. In one example embodiment where sufficient labeled data from a source domain is available, a goal is to assign labels (from the set of labels in the source domain) to data from a similar target domain having few or no labels. Examples of related domains can be indoor vs. outdoor pictures, summer vs. winter pictures, or pictures with different resolutions. The source domain will generally have some information that is useful for labeling, but which is not available in the other domain. For instance, it is easier to identify ripe fruit in a low-resolution color picture by using the color information. Nonetheless, using the color information to classify grayscale pictures can lead to poor accuracy in another domain. Another general problem is that the characteristics of a domain may change over time. With older training samples, the test accuracy may deteriorate as the content of the domain evolves. It is therefore quite pertinent in one or more embodiments to only use information common to the different domains for DA in transfer learning.

One way to achieve faithful DA is to have a neural network create a domain-independent representation (DIRep) of the data from different domains. It is assumed that a representation is domain independent if one cannot determine from the representation which domain the information originated from. If, from the domain-independent representation, the objects from the source domain can be classified, then there is a chance that they can be classified in the target domain as well. To achieve domain independence, a discriminator and a generator are adversarially trained. The generator is trained to create a DIRep from which the discriminator cannot determine the original domain of the data. The discriminator is trained to determine the original domain of the data.

However, the adversarial domain adaptation approach can suffer from what is called the "hidden data effect" herein, which can be explained through an example in the security context. Assume that an attacker using a legacy system attacks a system where the defending system found some telltale indication of an attack in the input data and defended against the attack. Later, however, more sophisticated attackers avoided including that indication in their attacks; that is, the input data evolved over time to evade detection systems. The classifier has been trained on the earlier source data and, in order to get its accuracy to be maximal, the classifier "wants" the generator to preserve the information needed for classifying with the new attack indicators. If the generator recognizes whether the data comes from the source domain or from the target domain, and creates indications of classification in the DIRep when the data comes from the target domain, it can then fool the discriminator, improve classification accuracy of the source domain data, and lower its loss function; however, the classifier is not well-trained for the target domain, as the hidden data effect means that there is information in the DIRep that is useful in classification for data that comes from the source domain, but is of little value when the data comes from the target domain.

It is expected that the hidden data effect would be common in various domains, particularly those related to data drift, but it tends to not be an issue with standard deep learning benchmarks. Therefore, in one example embodiment, synthetic benchmarks are created where the source classifier can take advantage of certain source-only, synthetic spurious correlation information.

To address the hidden data effect, a novel algorithm called VAEGAN is disclosed that combines a variational autoencoder (VAE) with the GAN-based adversarial learning approach. In exemplary embodiments of the VAEGAN algorithm, classification is performed based on the DIRep of the data. In order to achieve more accurate DA, the DIRep contains as much information as possible. The ability to reconstruct the input samples is a good measure to examine if VAEGAN can preserve all the information. However, without domain dependent information, reconstructing input samples solely from the DIRep is not possible. In one or more embodiments, VAEGAN's solution to this problem is to store all domain dependent information in a domain-dependent representation (DDRep). An autoencoder is thus built to generate the DDRep and ensure that the DIRep and the DDRep together contain enough information to reconstruct the input samples. To push the DDRep to contain only domain dependent information, it is made as small as possible (by using a VAE loss) without preventing reconstruction. The idea is that a maximal DIRep can be built by minimizing the DDRep. An exemplary experimental implementation of VAEGAN was thoroughly empirically-tested and it was shown that example embodiments of the model are both less vulnerable to the hidden data effect and outperforms other algorithms in unsupervised domain adaptation. In addition, improved classification accuracy is achieved relative to the size of the training database, thus enabling smaller datasets to be used for training.

By including an autoencoder, it is required that all information needed for reconstruction is in either the DDRep or DIRep. This aids classification. It is shown below that DSN outperforms adversarial learning-based methods such as DANN and GAN-based algorithms.

While DSN uses loss functions to ensure the DIRep and DDRep are linearly different, one or more exemplary embodiments use either loss functions or explicit construction to ensure that the DDRep is small, and as a result the DIRep contains as much relevant information as possible. If the DSN does source classification when creating the DIRep, information needed for target classification may be found in the DDRep only via the hidden data effect. Moreover, the linear orthogonality may not guarantee a strict distinction between DIRep and DDRep, as the same (original) information can still be encoded into both of them in a non-linear manner. Furthermore, if a feature is encoded in the DDRep early in training, that may prevent it from being used for classification later, as the DIRep is required to be orthogonal to the DDRep. All these shortcomings of DSN can lead to some degree of hidden data effect, which can potentially lower the classification accuracy in the target domain. One or more embodiments improve domain adaptation performance by reducing/eliminating one, some, or all of these shortcomings.

The VAEGAN for Domain Adaptation

FIG. 1 is a block diagram for a variational autoencoder with generative adversarial network classifier system 210, in accordance with an example embodiment. Example embodiments of the system 210 combine GAN-based domain adaptation with a variational autoencoder (VAE) to create a maximal DIRep for transfer learning. In one example embodiment, the classifier system 210 includes five main entities: 1) a generator 232 (also referred to as G 232 herein); 2) a discriminator 240 (also referred to as D 240 herein); 3) a classifier 244 (also referred to as C 244 herein); 4) an encoder 220 (also referred to as E 220 herein); and 5) a decoder 228 (also referred to as F 228 herein). The five main entities may be implemented using neural networks (by neural network is meant the network architecture and all its weights). The encoder 220 may also be implemented with software running on a general-purpose computer, software running on a graphical processing unit (GPU), partially or completely in hardware, using a hardware accelerator, and the like.

The data considered by the classifier system 210 is given by (x, l, d) where x is the input data with $x^s$ and $x^t$ representing the source data 212 and target data 216, respectively, l is the label of sample x (if a label exists), and dis the domain identity (for example, as simple as a single label bit of 0 for the source domain data and 1 for the target domain data). In zero-shot or few-shot domain adaptation settings, l is available for all source data samples, but none or only a few known labels exist for the target samples. The input data x is fed into both encoder 220 and generator 232. DDRep 224 and DIRep 236 correspond to the intermediate outputs of the encoder 220 and the generator 232, respectively:

$$DDRep = E(x),\ DIRep = G(x), \tag{1}$$

which then serve as the inputs for the downstream networks: the discriminator 240, the classifier 244 and the decoder 228. In particular, DIRep serves as the input for the discriminator 240 and the classifier 244, and both DIRep and DDRep serve as the inputs for the decoder 228. The outputs of these three downstream networks are $\hat{x}$ from the decoder 228; $\hat{d}$ from the discriminator 240; and $\hat{l}$ from the classifier 244. These outputs are:

$$\hat{x} = F(DDRep, DIRep) = F(G(x), E(x)), \tag{2}$$

$$\hat{d} = D(DIRep) = D(G(x)), \tag{3}$$

$$\hat{l} = C(DIRep) = C(G(x)), \tag{4}$$

where the dependence of the outputs on the corresponding networks are listed explicitly.

Example loss functions utilized by the neural networks are defined below. Some measures of the differences between the predictions from the networks, i.e., ($\hat{x}$, $\hat{d}$, $\hat{l}$) and their actual values (x, d, l) are used to construct the loss functions. Typically, a loss function would take two arguments, a prediction, and the actual label/value. The name of the loss function is often used without specifying the arguments, and is done also for the discriminator, generator, classification, and reconstruction losses. Like a variational autoencoder (VAE), an additional KL divergence loss function for E 220 is introduced to create a minimal DDRep so most of the input information can be forced into the DIRep. All the loss functions are listed below with their dependence on specific neural networks shown explicitly:

$$\text{Classification loss: } \mathcal{L}_c = \mathcal{L}_c(\hat{l}, l) = \mathcal{L}_c(C(G(x), l)$$

$$\text{Discriminator loss: } \mathcal{L}_d = \mathcal{L}_d(\hat{d}, d) = \mathcal{L}_d(D(G(x), d)$$

Generator loss: one goal of the generator loss function is to train the generator 232 to fool the discriminator 240. So, the generator 232 has a smaller loss when the discriminator 240 makes the wrong prediction:

$$\mathcal{L}_g = \mathcal{L}_g(\hat{d}, 1-d) = \mathcal{L}_d(D(G(x)), 1-d)$$

Reconstruction loss:

$$\mathcal{L}_r = \mathcal{L}_r(\hat{x}, x) = \mathcal{L}_r(F(G(x), E(x)), x)$$

$$KL \text{ loss for generating } DDRep\text{: } \mathcal{L}_{kl} = D_{KL}(Pr(E(x)) \,\|\, \mathcal{N}(0, I))$$

For the reconstruction loss $\mathcal{L}_r$, the $L_2$-norm is used. For $\mathcal{L}_d$, $\mathcal{L}_g$, $\mathcal{L}_c$, cross entropy is used. More specifically, recall that the data is given by (x, l, d) where x is the input with $x^s$ and $x^t$ representing the source and target data, respectively, l is the label of the sample, and dis the domain identity.

In unsupervised domain adaptation, the classification loss applies only to the source domain and can be defined as the following:

$$\mathcal{L}_c = -\Sigma_{i=1}^{N_s} l_i^s \cdot \log \hat{l}_i^s \quad (5)$$

where $N_s$ represents the number of samples from the source domain, $$l_i^s$$

is the one-hot encoding of the label for source input $$x_i^s$$

and $$\hat{l}_i^s$$

is the softmax output of $$C(G(x_i^s)).$$

The discriminator loss trains the discriminator to predict whether the DIRep is generated from the source domain or the target domain. $N_t$ represents the number of samples from the target domain and $d_i$ is the output of $D(G(x_i))$.

$$\mathcal{L}_d = -\sum_{i=1}^{N_s+N_t}\{d_i \log \hat{d}_i + (1-d_i)\log(1-\hat{d}_i)\}$$

The generator loss is the GAN loss with inverted domain truth labels:

$$\mathcal{L}_g = -\sum_{i=1}^{N_s+N_t}\{(1-d_i)\log \hat{d}_i + d_i \log(1-\hat{d}_i)\}$$

For the reconstruction loss, the standard mean squared error loss calculated from both domains is used:

$$\mathcal{L}_r = \sum_i^{N_s} \|x_i^s - \hat{x}_i^s\|_2^2 + \sum_i^{N_t} \|x_i^t - \hat{x}_i^t\|_2^2$$

$$\text{where } \hat{x}_i^s = F(G(x_i^s), E(x_i^s)) \text{ and } \hat{x}_i^t = F(G(x_i^t), E(x_i^t))$$

Finally, KL-divergence loss measures the distance between the distribution of DDRep which comes from a Gaussian with mean $\mathbb{E}$ (DDRep) and variance $\mathbb{V}$ (DDRep) and the standard normal distribution.

$$\mathcal{L}_{kl} = D_{KL}(Pr(DDRep) \,\|\, \mathcal{N}(0, I)) = -\frac{1}{2}\left(1 + \log[\mathbb{V}(DDRep)] - \mathbb{V}(DDRep) - \mathbb{E}(DDRep)^2\right)$$

Figure 2:
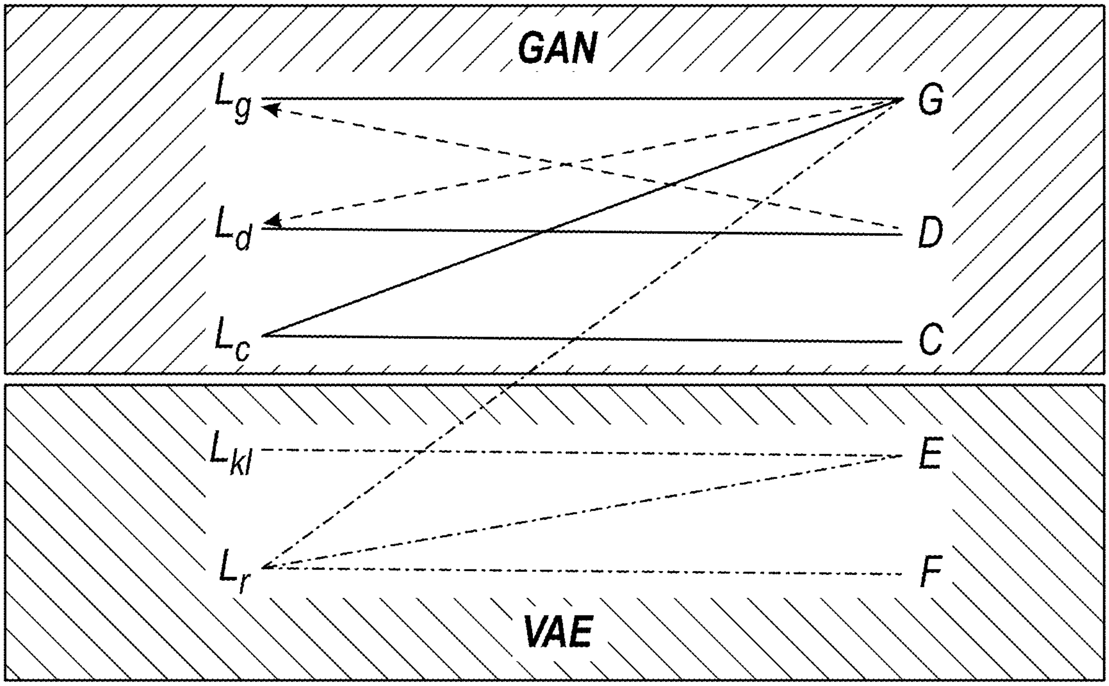
FIG. 2 illustrates the dependence between the loss functions and the neural networks (NN's) in a variational autoencoder with generative adversarial network (VAEGAN) algorithm, in accordance with an example embodiment.

FIG. 2 illustrates the dependence between the loss functions and the neural networks (NN's) in the VAEGAN algorithm, in accordance with an example embodiment. The only link between the GAN part of the algorithm and the VAE part of the algorithm is the dependence of $\mathcal{L}_r$ on the generator 232. The dotted arrowed links mean one-sided dependence. For example, the dotted link from the D, the discriminator 240, to $\mathcal{L}_g$ means that even though $\mathcal{L}_g$ depends on the discriminator 240, the update of the discriminator 240 only depends on $\mathcal{L}_d$, the discriminator loss. All solid lines are bi-directional, i.e., the loss function depends on the neural network (NN) and the updates of the NN depends on the loss function.

Back-Propagation Based Learning

The gradient-descent based learning dynamics for updating the neural networks can be described by the following equations:

$$\Delta G = -\alpha_G\left(\lambda\frac{\partial \mathcal{L}_g}{\partial G} + \beta\frac{\partial \mathcal{L}_c}{\partial G} + \gamma\frac{\partial \mathcal{L}_r}{\partial G}\right), \quad (5)$$

$$\Delta C = -\alpha_C\frac{\partial \mathcal{L}_c}{\partial C}, \quad (6)$$

$$\Delta D = -\alpha_D\frac{\partial \mathcal{L}_d}{\partial D}, \quad (7)$$

$$\Delta E = -\alpha_E\left(\frac{\partial \mathcal{L}_{kl}}{\partial E} + \mu\frac{\partial \mathcal{L}_r}{\partial E}\right), \quad (8)$$

$$\Delta F = -\alpha_F\frac{\partial \mathcal{L}_r}{\partial F}, \quad (9)$$

where $\alpha_{C,D,E,F,G}$ are the learning rates for different neural networks. In experiments, the learning rates were often set the same, but they can be different in principle. The other hyperparameters λ, β, γ, and μ are the relative weights of the loss functions. These hyperparameters are also useful to understand the different algorithms. As can be seen from the equations above, when $\lambda=0$, the GAN-based algorithm (upper part in FIG. 2) decouples from the VAE-based constraints (lower part in FIG. 2).

The Explicit DDRep Algorithm

To make the DIRep contain as much information as possible, a simplified explicit DDRep algorithm without the encoder 220 is introduced and the DDRep is set explicitly to be the domain label (bit) d, i.e., DDRep=d. A variant of this approach is to add d to the DDRep generated by the encoder 220. The domain label (bit) dis the simplest possible domain dependent information that could serve to filter out the domain dependent information from the DIRep.

It is worth noting that in several limited cases the explicit DDRep performs as well as the VAEGAN. The VAEGAN is believed to be more general, however. When doing experiments with the VAEGAN model, it was observed that the KL divergence of the DDRep corresponds to less than one bit measured as entropy. What is believed to happen is that the DIRep contains information to describe both the original data and some generated information describing an alternative as if it came from the other domain. Then the DDRep merely has enough information for the decoder to determine which information to use in reconstructing the original data.

Figure 7:
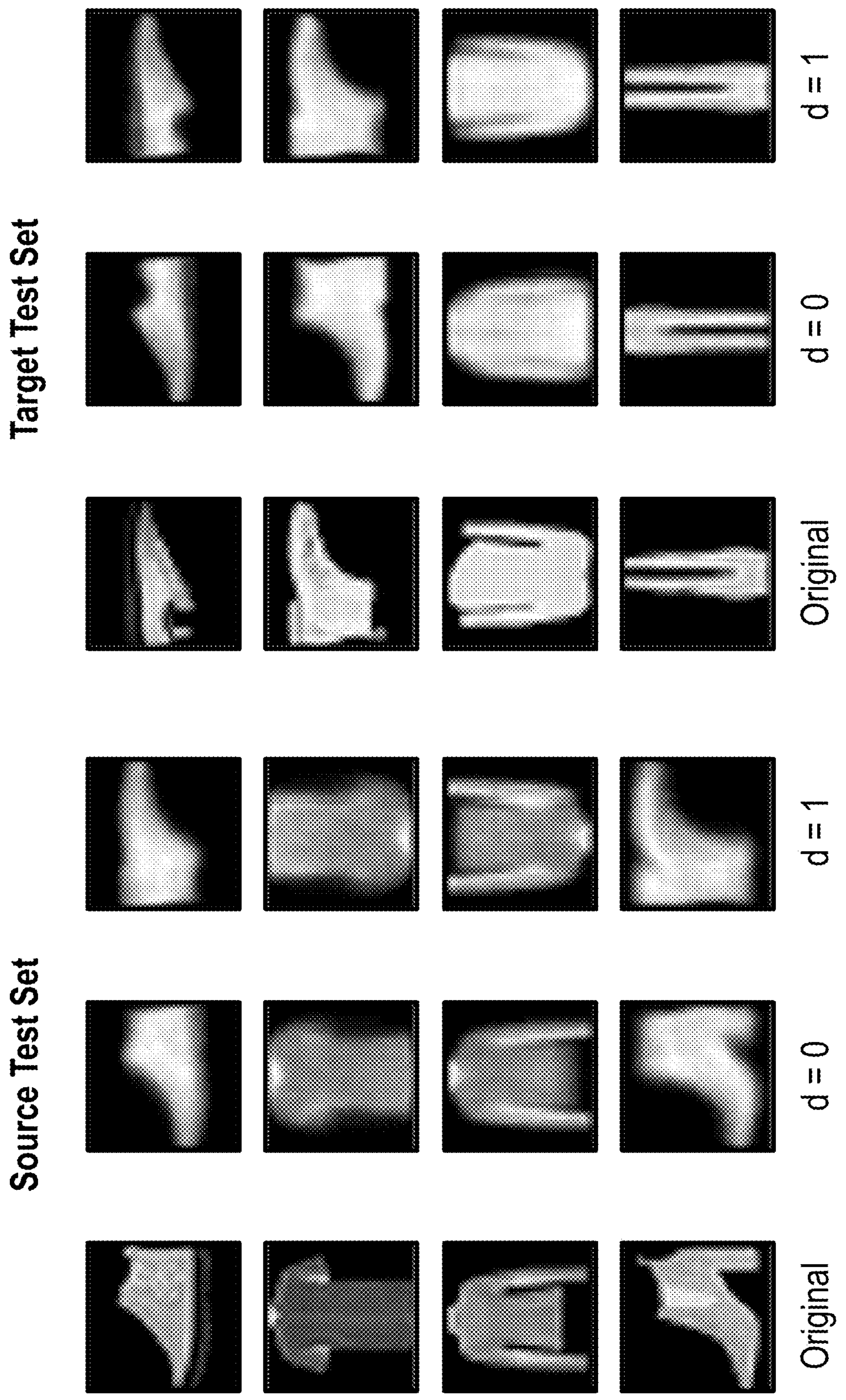
FIG. 7 shows reconstructed images for the adaptation shift scenario, in accordance with an example embodiment.

One useful feature of this simplified algorithm is that it allows checking the effect of the DDRep directly by flipping the domain bit ($d \rightarrow 1-d$). It is known that the domain bit is effective in filtering out domain dependent information from the DIRep if the reconstructed image $\hat{x}=F$ (DIRep, $1-d$) resembles an image from the other domain as shown in FIG. 7 (columns 1 and 4, original images; columns 2 and 6, reconstructions of originals; columns 3 and 5, reconstructions with domain bit flipped).

Comparing VAEGAN to DSN

One or more embodiments of the disclosed VAEGAN model share several features with DSN. However, they do not limit DDRep and DIRep to be in the same embedding space, giving them freedom to capture different features from source and target samples. Moreover, one or more embodiments of VAEGAN go beyond the linear orthogonality by exploiting the nonlinear KL-divergence. Specifically, one or more embodiments of VAEGAN attempt to keep DDRep as small as possible. As demonstrated in one set of experiments on a second conventional dataset, the DDRep can be as small as a single bit, yet it still gets the task done properly. The advantage of keeping DDRep small is that VAEGAN can force as much common sharing information between the two domains as possible into the DIRep, which maximizes the chances of success for the classifier C in both data domains.

Experiments

The experiments described herein demonstrate that VAEGAN generates superior results. It is demonstrated that the hidden data effect takes place in an artificial setting. It is anticipated that the hidden data effect also takes place in natural settings. Then, more natural settings are used to show that a real advantage is attained over a DANN-like system and even a DSN-like system. Since the generator and classifier topologies are the same in all of these systems, experiments were conducted to show that the weights trained by VAEGANs are usually better. The DANN systems may occasionally be able to equal the performance of exemplary embodiments, but the person training the system cannot know how well they did without extensive testing. Thus, multiple runs and a z-score have been used to assess whether one set of runs is statistically better than another. The insertion of synthetic spurious correlations is one example technique for encouraging the hidden data effect. If a Google search is performed for images of wolves, probably half of them are in snow. If a Google search is performed for dogs, none of them are likely to be in snow. So, if it is desired to classify dogs from wolves (where the domain is images on the internet), snow is very helpful. But suppose it is desired to classify dogs from wolves in the results stemming from the query "animals in winter". In that case, snow is useless. By adding information to enable a classifier of images to take advantage of useful information only available in one domain, it has been found that the hidden data effect is encouraged. What is called the "synthetic spurious correlation scenario" and "taking advantage of synthetic spurious correlations" herein is a common problem that occurs in some natural domain adaptations.

Several domain adaptation scenarios are constructed where some SSC clues exist in the source domain based on two widely used image datasets: (1) the second conventional dataset, which consists of 60,000 grayscale images for training and 10,000 images for testing (each image is represented as a 2-dimensional tensor of 28×28 and belongs to one of 10 classes); and (2) the first conventional dataset 2 which consists of 50,000 images for training and 10,000 images for testing from 10 classes (each image is represented by a 32×32×3 tensor (i.e., a color image with 3 channels of Red, Green and Blue)).

An example model was validated on the standard benchmarks for unsupervised domain adaption, namely a first conventional dataset that includes a large database of handwritten digits, a second conventional dataset that includes the large database of handwritten digits of the first conventional dataset combined with patches extracted from color photos, a third conventional dataset that includes 60,000 images of printed digits and a fourth conventional dataset of synthetic digits. Exemplary embodiments of VAEGAN achieve superior adaptation performance compared to previous works without using any validation samples from target to tune hyper-parameters.

Classification of the Second Conventional Dataset

A Simple Synthetic Dataset

The present experiments were started with a synthetic dataset to demonstrate the ability of VAEGAN to generate a more useful DIRep. The original second conventional dataset was used as the source data and every image was flipped 180 degrees to derive the target samples. Data domain-specific "synthetic spurious correlation (SSC)" bits were added to the source and target images. For each source image, one-hot bits of its label were appended to the vectorized image, e.g., $e_0=(1, 0, 0, 0, 0, 0, 0, 0, 0)$ for all images of class 0, $e_1=(0, 1, 0, 0, 0, 0, 0, 0, 0)$ for images of class 1, etc. For the target SSC bits, the one-hot bits of a truth label were shifted to the right by 1, i.e., $e_0=(0, 1, 0, 0, 0, 0, 0, 0, 0)$ for all images of class 0; $e_1=(0, 0, 1, 0, 0, 0, 0, 0, 0)$ for all images of class 1. The mapping from the SSC bits to the image in the target domain is still unique, just different from that in the source domain. This is called the adaptation shift scenario herein. A more difficult scenario is where one-hot bits of random labels are appended to the target images, which is referred to as the random SSC scenario herein.

In the source dataset, the one-hot bits serve as the SSC clue, which the algorithm can use to classify perfectly. The one-hot bits have the same distribution in the source and target data sets, so if they are reflected in the DIRep, the discriminator 240 would not detect the difference between source and target.

If a GAN-like unsupervised domain adaptation algorithm is used, via the hidden data effect, the DIRep can mostly contain information about the one-hot bits, which can classify perfectly and easily for the labeled source data. That information can also elude the discriminator as it has the same distribution both in source and target domains. In this case, a classifier trained from this partial representation will perform poorly on the target data.

Benchmark Algorithms

An example method was evaluated on the constructed second conventional datasets by comparing against the prevailing unsupervised domain adaptation approaches: a conventional GAN-based approach, Domain-Adversarial Neural networks (DANN) and Domain Separation Networks (DSN). Both VAEGAN and the explicit DDRep algorithm were implemented in the zero-shot setting. Only the results from the explicit DDRep algorithm are reported as it achieves almost identical performance on this task. Two baselines are also provided, a classifier trained on the source domain samples without domain adaptation (which gives the lower bound on target classification accuracy) and a classifier trained on the target domain samples (which gives the upper bound).

The Architecture and Training Procedure

All the models above are dense networks and have the same architecture as VAEGAN when applicable. For the GAN-based approach and DANN, the decoder and corresponding losses are turned off. For the DSN, the same network architecture is maintained for common networks and $\mathcal{L}_g$ is used for the similarity loss. Furthermore, the shared and private encoders are implemented with the same shape output vectors. The setup of weights of the loss functions used with the DSN and DANN are closely followed Results and Analysis FIG. 3 is a table that summarizes the mean classification accuracy (%) of different unsupervised domain adaptation approaches for three SSC scenarios (for the constructed second conventional datasets), in accordance with an example embodiment. In the scenario without synthetic spurious correlations, the original second conventional dataset are used as source and the second conventional dataset is flipped for the target. FIG. 4 is a table showing the z-test score value of the comparison of the mean classification accuracy of the method of example embodiments with the mean classification accuracy of other methods over five independent runs (z>2.3 means the probability of VAEGAN being no better is ≤0.01), in accordance with an example embodiment. The higher the z-score, the more statistical confidence there should be that the disclosed method outperforms the other methods. A z-score of 2.33 corresponds to 99% confidence that the disclosed method is superior, assuming that the accuracy over different runs will be Gaussianly-distributed.

In the scenario without synthetic spurious correlations, VAEGAN outperforms GAN-based and DANN, and matches the result of DSN. Performance of GAN-based and DANN results in a 5% accuracy drop for the adaptation shift scenario and 10% drop for the random SSC scenario. This validates the disclosed concern with the hidden data effect. The source SSC bits can be picked up in the DIRep as they represent an easy solution for the classifier that is trained only with source samples. If that is the case, then the performance of this SSC generator would perform poorly for the target domain, which has different SSC bits. An exemplary embodiment used in experiments had only 1% and 5% accuracy drop, respectively, and is less vulnerable to the hidden data effect. As a reconstruction-based method, DSN performs better in the presence of SSC bits. In the adaptation shift and random SSC scenarios, example embodiments significantly outperform DSN with a z-score of 2.60 and 3.18, respectively, which shows the effectiveness of the disclosed intuition that penalizing the size of DDRep can drive as much information as possible to the DIRep.

In the explicit DDRep algorithm, the DDRep is minimal since it contains only the originating domain label. Given a richer DIRep, the method of an example embodiment leads to a classifier 244 based on the invariant features of the images, which improves its performance on the target data.

As was mentioned above, the decoder 228 learns to reconstruct the image by using DIRep and DDRep (domain bit) together. FIG. 7 shows reconstructed images for the shift scenario, in accordance with an example embodiment. The reconstructed images are a bit fuzzier and perhaps a bit more like generic images of elements in the same class. Some details seem to be getting lost despite the reproduction. Nevertheless, the reconstructed images have rendered the domain bit effective in filtering out domain-dependent information, as the reconstructed images look like they are from the other domain when the domain bit was flipped.

Classification of the First Conventional Dataset Spurious Correlations

More natural domain adaptation scenarios, where the source and target images might be captured with different sensors, and thus have different wavelengths and colors, are of interest. To address this use case, exemplary source and target datasets were created based on the first conventional dataset with different color planes. Furthermore, the SSC color plane was introduced where the choice of the color planes in the source data have some spurious correlation with the labels. A similar hidden data effect was observed on the first conventional dataset set with spurious correlation, suggesting that the optimization difficulties of previous methods and the effects of a number of example embodiments are not limited to a particular dataset. The source set with SSC color planes is constructed as follows. First, labels in the first conventional dataset are encoded with values between 0 and 9. Then, for each image of the first conventional dataset, if its label is odd, only the B channel is kept with prob p, and the B or the R channel are randomly kept for the rest. Similarly, if the label is even, with prob p, the image has only the R color channel, and either the R or B channel is kept for the rest. For example, when p=1, all images with odd labels have only the B channel and all images with even labels have only the R channel. The parameter p is called the bias herein, since it controls the strength of the spurious correlation between the color of the image and its label. In the target domain, for each image of the first conventional dataset, only the G channel is kept regardless of the label. The approach(es) of an example embodiment and the other approaches are compared with p taking values from the set {0, 0.2, 0.4, 0.6, 0.8, 0.9, 1.0}. A larger value of p indicates a higher level of spurious correlation in the source data and thus a more challenging domain adaptation task.

In this "SSC-color-plane" setting, the GAN-like algorithms might take advantage of SSCs by leveraging the correlation between the presence or absence of the color planes and the label of the image to create an easier classification scheme for the labeled source data. Consequently, the DIRep would include false SSC clues which can cause performance degradation for the target data where the SSC clues lead to the wrong answer.

The Architecture and Training Procedure

When training with the approach of example embodiments, the network components are implemented as deep residual neural networks (ResNets) with short-cut connections. ResNets are easier to optimize, and sometimes gain accuracy from increased depth. For the approach of example embodiments, the full-fledged VAEGAN was implemented and the domain label was added to the DDRep generated by the encoder. The same ResNet-based architecture was implemented for all other approaches (when applicable). A weight decay of 0.0001 was used and BN was adopted for all the experiments.

Results and Analysis

FIG. 5 is a table showing the averaged classification accuracy (%) of different unsupervised domain adaptation approaches and example embodiments on the target test set (the constructed first conventional dataset with a spectrum of bias), in accordance with an example embodiment. FIG. 6 is a table showing the z-test score value comparing VAEGAN to other models (for the constructed first conventional dataset; z>2.3 means the probability of VAEGAN being no better than the other models is ≤0.01), in accordance with an example embodiment.

For all the domain adaptation tasks with varying biases, the approach of example embodiments were observed to outperform the other approaches in terms of accuracy in the target set. This improvement is most pronounced when the source data set has 60% and 80% bias levels, which means that over half of the source data has a spurious correlation between their color planes and labels. The poor performance of the GAN-based and DANN approaches is another example where the generator in these approaches learn a DIRep that depends on the spurious correlation. This false representation leads to an issue similar to over-fitting where the model performs well on the source data, but does not generalize well on the target data in which the same correlation does not exist. In the DSN approach, the shared representation contains some domain-independent information other than the SSC clues which helps classification in the target domain. However, it does not directly address the problem of making the domain invariant representation richer for classification. It is postulated that the inferior performance of the DSN approach may stem from the way its shared and private representations are trained. The difference loss in DSN only encourages orthogonality between the shared and the private representations in a linear way, which can be less effective in separating domain dependent and independent information for difficult domain adaptation scenarios.

Semi-Supervised Domain Adaptation

As an additional experiment, the proposed algorithm was also evaluated for semi-supervised domain adaptation on the constructed first conventional datasets. The model sees a majority of unlabeled target data and is provided with a small amount of labeled target data. In an example setting, 1, 5, 10, 20, 50 and 100 samples per class were revealed which were then used for contributing to the classification loss through the label prediction pipeline. The same number of labels were also provided for the GAN and DSN method. The DANN method was skipped since its performance is very similar to the GAN approach. More importantly, the following question was posed: How much does each algorithm gain from a small, labeled target training set for different biases? The classification loss on the target ensures that the generator does not get away with learning a DIRep that contains only the SSC clue, which could bias the model during training and cause a high classification loss.

Figure 8:
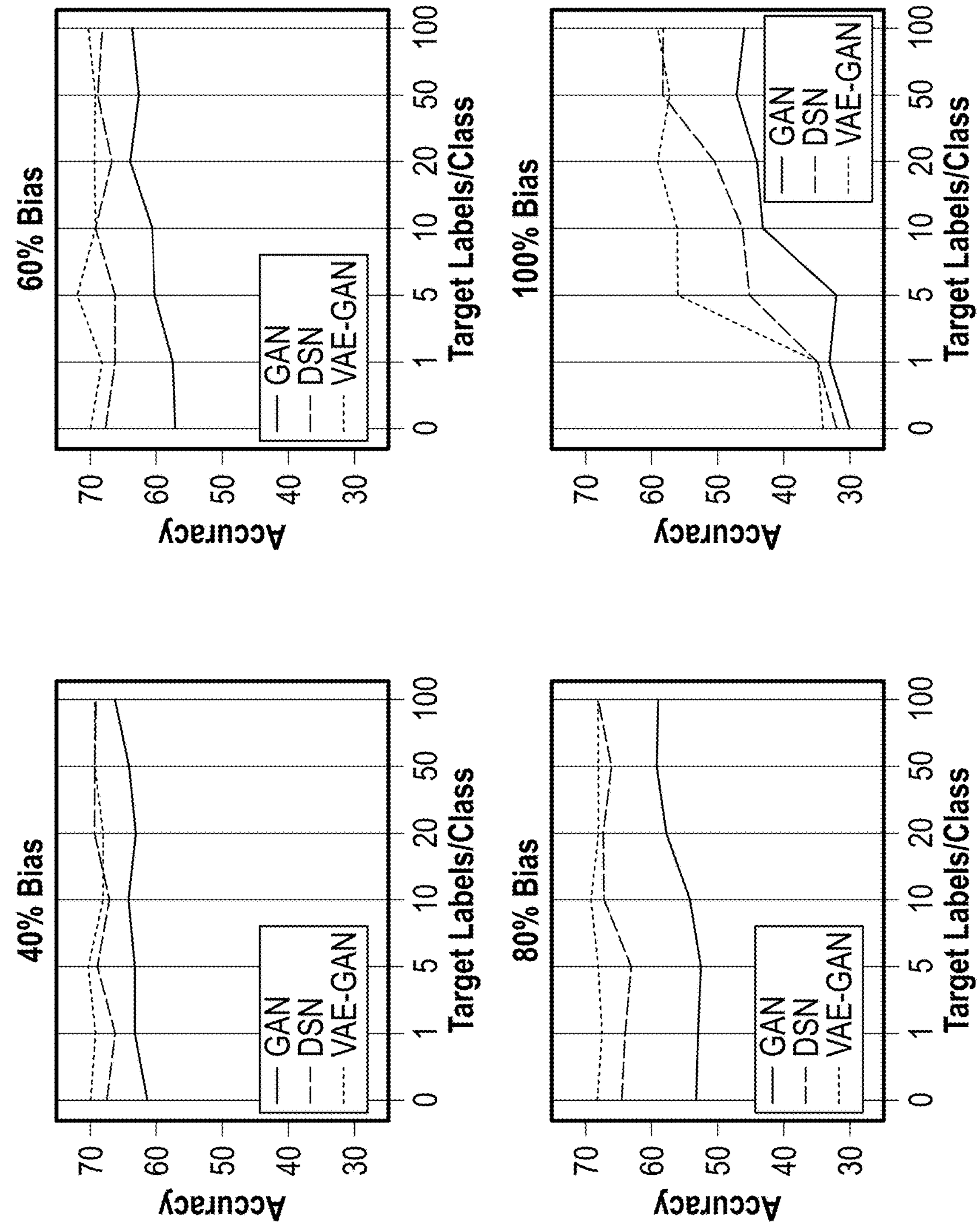
FIG. 8 shows graphs of the mean classification accuracy on a first conventional dataset with semi-supervised setting for three different unsupervised domain adaptation algorithms, in accordance with an example embodiment.
Figure 9:
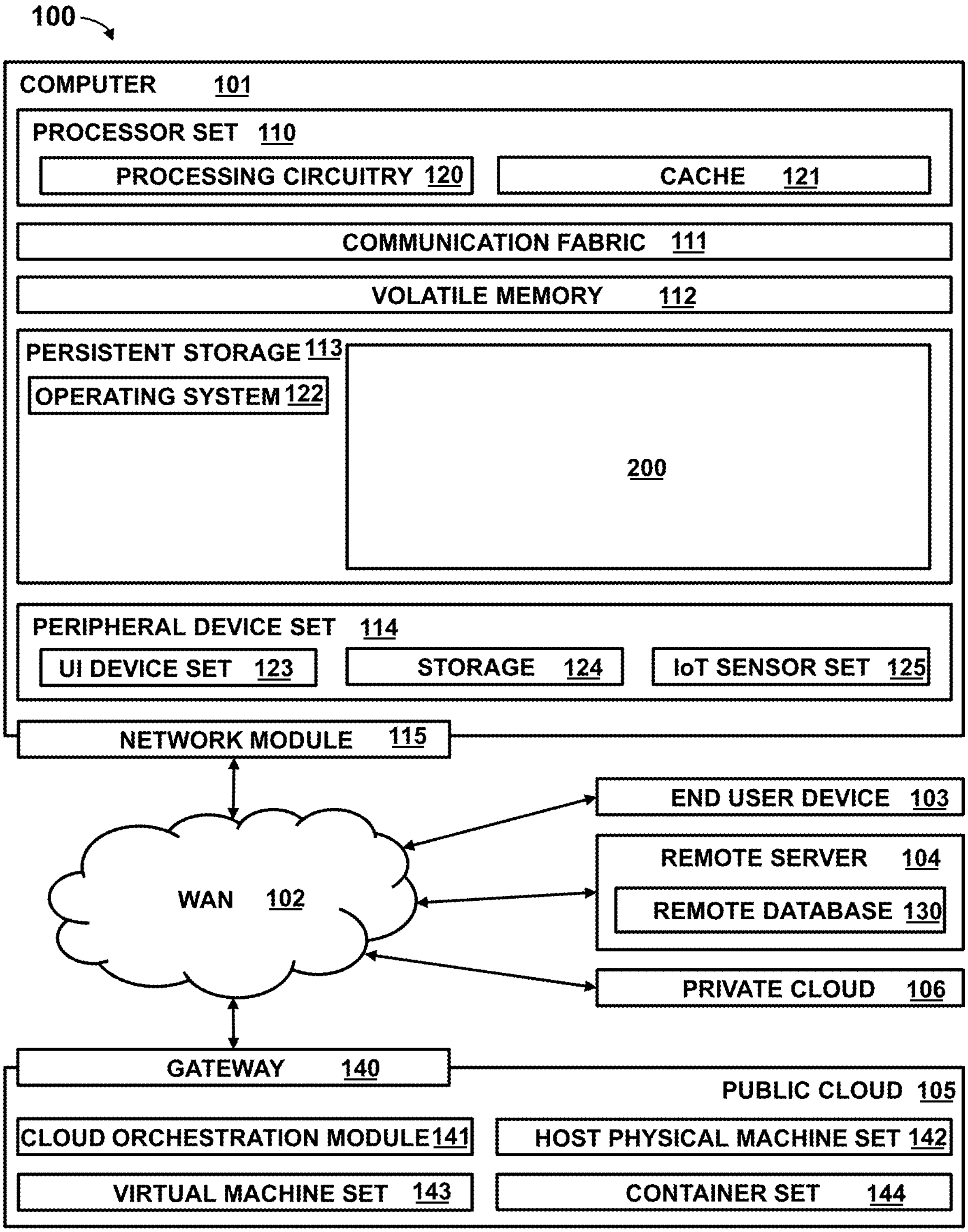
FIG. 9 depicts a computing environment according to an embodiment of the present invention.

Four most representative biases were selected. FIG. 8 shows graphs of the mean classification accuracy on the first conventional dataset with a semi-supervised setting for three different unsupervised domain adaptation algorithms, in accordance with an example embodiment. Overall, a few target labels improve classification accuracy. The improvement is significant in 100% bias setting. For 40%, 60% and 80% biases, the classification accuracy does improve, but not significantly as the number of target labels increases. The performance order of VAEGAN>DSN>GAN-based is preserved. When bias equals 100%, the performance curves are quite different. All of them increase significantly with the number of target labels, while the order of performance is preserved. While all three algorithms benefit from a small number of target labeled samples, example embodiments of VAEGAN improve the most, surpassing DNS and GAN-based results by 12% and 25%, respectively, with only a total of 50 target labels.

The challenges in domain adaptation caused by the hidden data effect have been described and a better solution than previous methods has been presented for a number of common imaging datasets. The hidden data effect is more likely to appear in more complex data problems, e.g., more of its impact is seen in the first conventional dataset than in the second conventional dataset. The hidden data effect is also likely to appear when there is a drift in data, making classification more difficult. For example, early papers on spam described specific characteristics that enabled spam to be recognized. It is unlikely that more sophisticated spammers still provide those characteristics, but some less sophisticated ones may. It is expensive to label messages as "spam" or "not spam," and it would be beneficial to be able to use an old set of labels to train a system to handle new messages. One or more embodiments of the disclosed VAEGAN algorithm allow exactly that. It was shown that using a DIRep and DDRep trained with both a variational autoencoder and a discriminator makes a good base (DIRep) for a classifier, when pressure for the DDRep to be small is added.

Given the discussion thus far, it will be appreciated that, in general terms, an exemplary method, according to an aspect of the invention, includes the operations of generating a domain-independent representation of an input data sample; generating a domain-dependent representation of the input data sample; configuring a decoder 228 to ensure that a combination of the domain-independent representation and the domain-dependent representation contains sufficient information to reconstruct the input data sample; configuring a discriminator 240 to attempt to determine an originating domain of the domain-independent representation; configuring a classifier 244 to classify the input data sample based on the domain-independent representation of the input data sample; and configuring a generator 232 to generate the domain-independent representation of the input data sample such that it fools the discriminator 240, enables the classifier 244 to classify the input data sample, and enables a reconstruction of the input sample from the domain-independent representation and the domain-dependent representation and wherein the domain-dependent representation is constrained to have low information content.

In one aspect, an exemplary apparatus/system includes a generator 232 configured to generate a domain-independent representation of an input data sample; an encoder 220 configured to generate a domain-dependent representation of the input data sample; a decoder 228 configured to ensure that a combination of the domain-independent representation and the domain-dependent representation contains sufficient information to reconstruct the input data sample; a discriminator 240 configured to attempt to determine an originating domain of the domain-independent representation; and a classifier 244 configured to classify the input data sample based on the domain-independent representation of the input data sample; wherein the generator 232 is configured to generate the domain-independent representation of the input data sample such that it fools the discriminator 240, enables the classifier 244 to classify the input data sample, and enables the decoder 228 to reconstruct the input sample from the domain-independent representation and the domain-dependent representation and wherein the domain-dependent representation is constrained to have low information content.

In one example embodiment, the domain-dependent representation is constrained to have low information content relative to the domain-independent representation.

In one example embodiment, the generator 232 receives generator input information related to a first domain and a second target domain and transforms the generator input information into the domain-independent representation of common elements of the first domain and the second target domain; the encoder 220 receives the generator input information related to the first domain and the second target domain and transforms the generator input information into the domain-dependent representation, wherein the domain-dependent representation is a representation of elements to be reproduced; and the decoder 228 receives as inputs the domain independent representation and the domain dependent representation, the output of the decoder 228 being used to train the encoder 220 and the generator 232 so the domain-independent representation is able to reproduce predictions that match an original first domain.

In one example embodiment, the encoder 220 is configured to be penalized during training based on information content of the domain-dependent representation, such that an amount of information is increased in the domain-independent representation and an amount of information is decreased in the domain-dependent representation.

In one example embodiment, the content of the domain dependent representation is constrained to be dependent only on an identifier of an originating domain of the input data sample.

In one example embodiment, the generator 232 comprises a first generator for an input data sample of a source domain and a second generator for an input data sample a target domain.

In one example embodiment, a loss function for the classifier 244 is:

$$\mathcal{L}_c = \mathcal{L}_c(\hat{l}, l) = \mathcal{L}_c(C(G(x), l);$$

In one example embodiment, a loss function for the discriminator 240 is:

$$\mathcal{L}_d = \mathcal{L}_d(\hat{d}, d) = \mathcal{L}_d(D(G(x), d).$$

In one example embodiment, the generator 232 has a smaller loss when the discriminator 240 makes a wrong prediction and a loss function for the generator 232 is:

$$\mathcal{L}_g = \mathcal{L}_g(\hat{d}, 1-d) = \mathcal{L}_d(D(G(x)), 1-d).$$

In one example embodiment, a reconstruction loss of the decoder 228 is:

$$\mathcal{L}_r = \mathcal{L}_r(\hat{x}, x) = \mathcal{L}_r(F(G(x), E(x)), x).$$

In one example embodiment, a Kullback-Leibler Divergence loss for the encoder

220 and the data-dependent representation is:

$$\mathcal{L}_{kl} = D_{KL}(Pr(E(x)) \,\|\, \mathcal{N}(0, I)).$$

In one example embodiment, the encoder 220 is configured to use a $L_2$-norm loss for a reconstruction loss and the discriminator 240 is configured with a discriminator loss, the generator 232 is configured with a generator loss, and the classifier 244 is configured with a classifier loss, wherein the discriminator loss, the generator loss, and the classifier loss are based on cross entropy.

In one example embodiment, a gradient-descent based learning dynamic for the generator 232 is based on:

$$\Delta G = -\alpha_G\left(\lambda\frac{\partial \mathcal{L}_g}{\partial G} + \beta\frac{\partial \mathcal{L}_c}{\partial G} + \gamma\frac{\partial \mathcal{L}_r}{\partial G}\right);$$

a gradient-descent based learning dynamic for the classifier 244 is based on:

$$\Delta C = -\alpha_C\frac{\partial \mathcal{L}_c}{\partial C};$$

a gradient-descent based learning dynamic for the discriminator 240 is based on:

$$\Delta D = -\alpha_D\frac{\partial \mathcal{L}_d}{\partial D};$$

a gradient-descent based learning dynamic for the encoder 220 is based on:

$$\Delta E = -\alpha_E\left(\frac{\partial \mathcal{L}_{kl}}{\partial E} + \mu\frac{\partial \mathcal{L}_r}{\partial E}\right);$$

and a gradient-descent based learning dynamic for the decoder 228 is based on:

$$\Delta F = -\alpha_F \frac{\partial \mathcal{L}_r}{\partial F};$$

wherein $\alpha_{C,D,E,F,G}$ are learning rates, $\mathcal{L}_d$ is a discriminator loss, $\mathcal{L}_g$ is a generator loss, and $\mathcal{L}_c$ is a classifier loss.

In one example embodiment, an apparatus is configured to classify data that evolves over time.

In one example embodiment, the domain-dependent representation is a label indicating an originating domain of the input data sample.

In one or more example embodiments, low information content of the domain dependent representation is defined relative to the information content of the domain-independent representation; i.e., the domain dependent representation is constrained to have low information content relative to the domain-independent representation.

In one or more example embodiments, the domain-dependent representation is constrained to have low information content in the sense that the encoder 220 is configured to be penalized during training based on the information content of the domain-dependent representation, such that an amount of information is increased in the domain-independent representation and an amount of information is decreased in the domain-dependent representation.

In one or more example embodiments, the domain-dependent representation is constrained to have low information content in the sense that the content of the domain dependent representation is constrained to be dependent only on an identifier of an originating domain of the input data sample; for example, in some cases, the low information content of the domain dependent representation is based on an identifier of the originating domain that is one bit to four bits in length.

In one aspect, a computer program product comprises one or more tangible computer-readable storage media and program instructions stored on at least one of the one or more tangible computer-readable storage media, the program instructions executable by a processor, the program instructions comprising generating a domain-independent representation of an input data sample; generating a domain-dependent representation of the input data sample; configuring a decoder 228 to ensure that a combination of the domain-independent representation and the domain-dependent representation contains sufficient information to reconstruct the input data sample; configuring a discriminator 240 to attempt to determine an originating domain of the domain-independent representation; configuring a classifier 244 to classify the input data sample based on the domain-independent representation of the input data sample; and configuring a generator 232 to generate the domain-independent representation of the input data sample such that it fools the discriminator 240, enables the classifier 244 to classify the input data sample, and enables a reconstruction of the input sample from the domain-independent representation and the domain-dependent representation and wherein the domain-dependent representation is constrained to have low information content.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as, at 200, at least a portion of a machine learning system implementing an autoencoder with generative adversarial networks for transfer learning between domains. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future.

In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:

a memory; and at least one processor, coupled to the memory, and operative to perform operations comprising:

generating, via a generator neural network, a domain-independent representation of an input data sample;

generating, via an encoder neural network, a domain-dependent representation of the input data sample, wherein the domain-dependent representation is constrained to have information content lower than information content of the domain-independent representation;

reconstructing, via a decoder neural network, the input data sample from a combination of the domain-independent representation and the domain-dependent representation;

updating the encoder neural network based on a reconstruction loss of the decoder neural network;

attempting to determine, via a discriminator neural network, an originating domain of the domain-independent representation;

updating the generator neural network based on the reconstruction loss and the attempting to determine the originating domain;

penalizing, based on the information content of the domain-dependent representation, the encoder neural network to decrease an amount of information in the domain-dependent representation and increase an amount of information in the domain-independent representation; and classifying, via a classifier neural network, the input data sample based on the domain-independent representation of the input data sample, wherein the domain-independent representation is based on the updating of the encoder neural network, the updating of the generator neural network, and the penalizing of the encoder neural network, wherein the generator neural network is configured to generate the domain-independent representation of the input data sample such that it fools the discriminator neural network, enables the classifier neural network to classify the input data sample, and enables the decoder neural network to reconstruct the input data sample.

2. The apparatus of claim 1, wherein the operations further comprise:

receiving, via the generator neural network, generator input information related to a first domain and a second target domain;

transforming, via the generator neural network, the generator input information into the domain-independent representation of common elements of the first domain and the second target domain;

receiving, via the encoder neural network, the generator input information related to the first domain and the second target domain;

transforming, via the encoder neural network, the generator input information into the domain-dependent representation, wherein the domain-dependent representation is a representation of elements to be reproduced; and receiving, via the decoder neural network, the domain-independent representation and the domain-dependent representation as inputs, wherein an output of the decoder neural network is used for training the encoder neural network and the generator neural network so that the domain-independent representation is able to reproduce predictions that match the first domain.

3. The apparatus of claim 1, wherein the information content of the domain-dependent representation is constrained to be dependent only on an identifier of an originating domain of the input data sample.

4. The apparatus of claim 1, wherein the generator neural network comprises a first generator neural network for an input data sample of a source domain and a second generator neural network for an input data sample of a target domain.

5. The apparatus of claim 1, wherein a loss function for the classifier neural network is:

$$\mathcal{L}_c = \mathcal{L}_c(\hat{l}, l) = \mathcal{L}_c(C(G(x), l).$$

6. The apparatus of claim 1, wherein a loss function for the discriminator neural network is:

$$\mathcal{L}_d = \mathcal{L}_d(\hat{d}, d) = \mathcal{L}_d(D(G(x), d).$$

7. The apparatus of claim 1, wherein the generator neural network has a smaller loss when the discriminator neural network makes a wrong prediction, and a loss function for the generator neural network is:

$$\mathcal{L}_g = \mathcal{L}_g(\hat{d}, 1-d) = \mathcal{L}_d(D(G(x)), 1-d).$$

8. The apparatus of claim 1, wherein the reconstruction loss of the decoder neural network is:

$$\mathcal{L}_r = \mathcal{L}_r(\hat{x}, x) = \mathcal{L}_r(F(G(x), E(x)), x).$$

9. The apparatus of claim 1, wherein a Kullback-Leibler Divergence loss for the encoder neural network and the domain-dependent representation is:

$$\mathcal{L}_{kl} = D_{KL}(PR(E(x)) \,||\, \mathcal{N}(0, I)).$$

10. The apparatus of claim 1, wherein the encoder neural network is configured to use a $L_2$-norm loss for the reconstruction loss, the discriminator neural network is configured with a discriminator loss, the generator neural network is configured with a generator loss, and the classifier neural network is configured with a classifier loss, wherein the discriminator loss, the generator loss, and the classifier loss are based on cross entropy.

11. The apparatus of claim 1, wherein a gradient-descent based learning dynamic for the generator neural network is based on:

$$\Delta G = -\alpha_G\left(\lambda\frac{\partial \mathcal{L}_g}{\partial G} + \beta\frac{\partial \mathcal{L}_c}{\partial G} + \gamma\frac{\partial \mathcal{L}_r}{\partial G}\right);$$

a gradient-descent based learning dynamic for the classifier neural network is based on:

$$\Delta C = -\alpha_C\frac{\partial \mathcal{L}_c}{\partial C};$$

a gradient-descent based learning dynamic for the discriminator neural network is based on:

$$\Delta D = -\alpha_D\frac{\partial \mathcal{L}_d}{\partial D};$$

a gradient-descent based learning dynamic for the encoder neural network is based on:

$$\Delta E = -\alpha_E\left(\frac{\partial \mathcal{L}_{kl}}{\partial E} + \mu\frac{\partial \mathcal{L}_r}{\partial E}\right); \text{ and}$$

a gradient-descent based learning dynamic for the decoder neural network is based on:

$$\Delta F = -\alpha_F \frac{\partial \mathcal{L}_r}{\partial F}.$$

wherein $\alpha_{C,D,E,F,G}$ are learning rates, $\mathcal{L}_d$ is a discriminator loss, $\mathcal{L}_g$ is a generator loss, and $\mathcal{L}_c$ is a classifier loss.

12. The apparatus of claim 1, wherein the operations further comprise classifying data that evolves over time.

13. The apparatus of claim 1, wherein the domain-dependent representation is a label indicating an originating domain of the input data sample.

14. A computer program product, comprising:

one or more tangible computer-readable storage media and program instructions stored on at least one of the one or more tangible computer-readable storage media, the program instructions executable by a processor, the program instructions comprising:

generating, via a generator neural network, a domain-independent representation of an input data sample;

generating, via an encoder neural network, a domain-dependent representation of the input data sample, wherein the domain-dependent representation is constrained to have information content lower than information content of the domain-independent representation;

reconstructing, via a decoder neural network, the input data sample from a combination of the domain-independent representation and the domain-dependent representation;

updating the encoder neural network based on a reconstruction loss of the decoder neural network;

attempting to determine, via a discriminator neural network, an originating domain of the domain-independent representation;

updating the generator neural network based on the reconstruction loss and the attempting to determine the originating domain;

penalizing, based on the information content of the domain-dependent representation, the encoder neural network to decrease an amount of information in the domain-dependent representation and increase an amount of information in the domain-independent representation; and classifying, via a classifier neural network, the input data sample based on the domain-independent representation of the input data sample, wherein the domain-independent representation is based on the updating of the encoder neural network, the updating of the generator neural network, and the penalizing of the encoder neural network, wherein the generator neural network is configured to generate the domain-independent representation of the input data sample such that it fools the discriminator neural network, enables the classifier neural network to classify the input data sample, and enables the decoder neural network to reconstruct the input data sample.

15. A computer-implemented method, comprising:

generating, via a generator neural network, a domain-independent representation of an input data sample;

generating, via an encoder neural network, a domain-dependent representation of the input data sample, wherein the domain-dependent representation is constrained to have information content lower than information content of the domain-independent representation;

reconstructing, via a decoder neural network, the input data sample from a combination of the domain-independent representation and the domain-dependent representation;

updating the encoder neural network based on a reconstruction loss of the decoder neural network;

attempting to determine, via a discriminator neural network, an originating domain of the domain-independent representation;

updating the generator neural network based on the reconstruction loss and the attempting to determine the originating domain;

penalizing, based on the information content of the domain-dependent representation, the encoder neural network to decrease an amount of information in the domain-dependent representation and increase an amount of information in the domain-independent representation; and classifying, via a classifier neural network, the input data sample based on the domain-independent representation of the input data sample, wherein the domain-independent representation is based on the updating of the encoder neural network, the updating of the generator neural network, and the penalizing of the encoder neural network, wherein the generator neural network is configured to generate the domain-independent representation of the input data sample such that it fools the discriminator neural network, enables the classifier neural network to classify the input data sample, and enables the decoder neural network to reconstruct the input data sample.

16. The computer-implemented method of claim 15, wherein the information content of the domain-dependent representation is constrained to be dependent only on an identifier of an originating domain of the input data sample.

* * * * *